(12) United States Patent
van der Westhuizen

(10) Patent No.: US 8,973,863 B1
(45) Date of Patent: Mar. 10, 2015

(54) BLADE ROOT ATTACHMENT APPARATUS AND METHOD

(75) Inventor: Jacob Johannes van der Westhuizen, South Jordan, UT (US)

(73) Assignee: Groen Brothers Aviation, Inc., Salt Lake City, UT (US)

( * ) Notice: Subject to any disclaimer, the term of this patent is extended or adjusted under 35 U.S.C. 154(b) by 522 days.

(21) Appl. No.: 13/199,705

(22) Filed: Sep. 7, 2011

Related U.S. Application Data

(60) Provisional application No. 61/381,291, filed on Sep. 9, 2010, provisional application No. 61/403,099, filed on Sep. 9, 2010, provisional application No. 61/403,097, filed on Sep. 9, 2010, provisional application No. 61/381,313, filed on Sep. 9, 2010, provisional application No. 61/403,111, filed on Sep. 9, 2010, provisional application No. 61/381,347, filed on Sep. 9, 2010, provisional application No. 61/403,136, filed on Sep. 9, 2010, provisional application No. 61/403,134, filed on Sep. 9, 2010, provisional application No. 61/460,572, filed on Jan. 3, 2011, provisional application No. 61/403,098, filed on Sep. 9, 2010, provisional application No.

(Continued)

(51) Int. Cl.
| | |
|---|---|
| *B64C 27/48* | (2006.01) |
| *B64C 27/18* | (2006.01) |
| *B64C 27/72* | (2006.01) |
| *B64C 27/02* | (2006.01) |
| *B64C 27/473* | (2006.01) |

(52) U.S. Cl.
CPC .......... *B64C 27/48* (2013.01); *B64C 27/72* (2013.01); *B64C 27/025* (2013.01); *B64C 27/18* (2013.01); *B64C 2027/4736* (2013.01)

USPC ............. 244/17.25; 244/17.11; 416/204 R; 416/248

(58) Field of Classification Search
USPC ..... 244/6, 7 R, 17.11, 17.25; 416/248, 204 R
See application file for complete search history.

(56) References Cited

U.S. PATENT DOCUMENTS

| | | | | |
|---|---|---|---|---|
| 2,534,353 | A * | 12/1950 | Hiller, Jr. et al. | 416/18 |
| 2,601,463 | A | 6/1952 | Stanley | |
| 2,925,129 | A * | 2/1960 | Yuan et al. | 416/1 |
| 3,494,424 | A | 2/1970 | Stanley | |
| 3,720,387 | A * | 3/1973 | Foote | 244/17.25 |
| 4,412,784 | A * | 11/1983 | Wackerle et al. | 416/230 |
| 4,589,611 | A | 5/1986 | Ramme et al. | |
| 5,085,315 | A * | 2/1992 | Sambell | 244/7 R |
| 5,934,873 | A | 8/1999 | Greene | |
| 6,371,730 | B1 * | 4/2002 | Wobben | 416/244 R |
| 7,147,182 | B1 | 12/2006 | Flanigan | |
| 7,871,034 | B2 * | 1/2011 | Karem | 244/7 A |
| 8,105,040 | B2 * | 1/2012 | Vronsky et al. | 416/204 R |
| 8,545,182 | B2 * | 10/2013 | Sorensen | 416/204 R |
| 8,591,187 | B2 * | 11/2013 | Bagepalli et al. | 416/1 |
| 2012/0134833 | A1 * | 5/2012 | Mashue | 416/204 R |

FOREIGN PATENT DOCUMENTS

| | | | | |
|---|---|---|---|---|
| WO | WO 9908928 A1 * | 2/1999 | | B64C 11/06 |
| WO | WO 2009089833 A2 * | 7/2009 | | F03D 1/06 |

*Primary Examiner* — Joseph W Sanderson
(74) *Attorney, Agent, or Firm* — Pate Baird, PLLC

(57) ABSTRACT

The rotorcraft may include an airframe, at least one engine connected to the airframe, and a rotor connected to the airframe. The rotor may include a hub, a rotor blade, and a feathering spindle connected to the hub. The rotor blade may have a root and a tip and form a conduit extending in the radial direction from the root to the tip. The root may comprise a wall forming a hollow circular cylinder. The hollow circular cylinder may form a portion of the conduit. A plurality of bolts may be distributed circumferential within the wall of the root. The plurality of bolts may extend in the radial direction from the wall of the root to secure the rotor blade to the feathering spindle.

17 Claims, 11 Drawing Sheets

Related U.S. Application Data

61/403,081, filed on Sep. 9, 2010, provisional application No. 61/403,135, filed on Sep. 9, 2010, provisional application No. 61/466,177, filed on Mar. 22, 2011, provisional application No. 61/409,475, filed on Nov. 2, 2010, provisional application No. 61/403,113, filed on Sep. 9, 2010, provisional application No. 61/409,478, filed on Nov. 2, 2010, provisional application No. 61/409,476, filed on Nov. 2, 2010, provisional application No. 61/409,482, filed on Nov. 2, 2010, provisional application No. 61/409,470, filed on Nov. 2, 2010, provisional application No. 61/517,413, filed on Apr. 19, 2011, provisional application No. 61/468,964, filed on Mar. 29, 2011, provisional application No. 61/409,487, filed on Nov. 2, 2010, provisional application No. 61/409,494, filed on Nov. 2, 2010, provisional application No. 61/456,219, filed on Nov. 2, 2010, provisional application No. 61/456,221, filed on Nov. 2, 2010, provisional application No. 61/456,220, filed on Nov. 2, 2010, provisional application No. 61/432,488, filed on Jan. 13, 2011, provisional application No. 61/506,572, filed on Jul. 11, 2011, provisional application No. 61/519,075, filed on May 16, 2011, provisional application No. 61/519,055, filed on May 16, 2011, provisional application No. 61/460,573, filed on Jan. 4, 2011, provisional application No. 61/461,223, filed on Jan. 13, 2011, provisional application No. 61/429,282, filed on Jan. 3, 2011, provisional application No. 61/429,289, filed on Jan. 3, 2011, provisional application No. 61/499,996, filed on Jun. 22, 2011, provisional application No. 61/575,196, filed on Aug. 17, 2011, provisional application No. 61/575,204, filed on Aug. 18, 2011.

BLADE ROOT ATTACHMENT APPARATUS AND METHOD

RELATED APPLICATIONS

This application claims the benefit of U.S. Provisional Patent Application Ser. No. 61/381,313, filed on Sep. 9, 2010, U.S. Provisional Patent Application Ser. No. 61/403,081, filed on Sep. 9, 2010, U.S. Provisional Patent Application Ser. No. 61/403,097, filed on Sep. 9, 2010, U.S. Provisional Patent Application Ser. No. 61/403,099, filed on Sep. 9, 2010, U.S. Provisional Patent Application Ser. No. 61/403,111, filed on Sep. 9, 2010, U.S. Provisional Patent Application Ser. No. 61/403,113 filed on Sep. 9, 2010, U.S. Provisional Patent Application Ser. No. 61/403,135, filed on Sep. 9, 2010, U.S. Provisional Patent Application Ser. No. 61/409,470, filed on Nov. 2, 2010, U.S. Provisional Patent Application Ser. No. 61/409,478, filed on Nov. 2, 2010, U.S. Provisional Patent Application Ser. No. 61/456,220, filed on Nov. 2, 2010, U.S. Provisional Patent Application Ser. No. 61/466,177, filed on Mar. 22, 2011, U.S. Provisional Patent Application Ser. No. 61/468,964, filed on Mar. 29, 2011, U.S. Provisional Patent Application Ser. No. 61/506,572, filed on Jul. 11, 2011, U.S. Provisional Patent Application Ser. No. 61/517,413, filed on Apr. 19, 2011, U.S. Provisional Patent Application Ser. No. 61/519,055, filed on May 16, and U.S. Provisional Patent Application Ser. No. 61/519,075, filed on May 16. This application incorporates herein by reference U.S. Provisional Patent Application Ser. No. 61/381,291, filed on Sep. 9, 2010, [etc].

This application claims the benefit of U.S. Provisional Patent Application Ser. No. 61/381,291, filed on Sep. 9, 2010, U.S. Provisional Patent Application Ser. No. 61/403,099, filed on Sep. 9, 2010, U.S. Provisional Patent Application Ser. No. 61/403,097, filed on Sep. 9, 2010, U.S. Provisional Patent Application Ser. No. 61/381,313, filed on Sep. 9, 2010, U.S. Provisional Patent Application Ser. No. 61/403,111, filed on Sep. 9, 2010, U.S. Provisional Patent Application Ser. No. 61/381,347, filed on Sep. 9, 2010, U.S. Provisional Patent Application Ser. No. 61/403,136, filed on Sep. 9, 2010, U.S. Provisional Patent Application Ser. No. 61/403,134, filed on Sep. 9, 2010, U.S. Provisional Patent Application Ser. No. 61/460,572, filed on Jan. 3, 2011, U.S. Provisional Patent Application Ser. No. 61/403,098, filed on Sep. 9, 2010, U.S. Provisional Patent Application Ser. No. 61/403,081, filed on Sep. 9, 2010, U.S. Provisional Patent Application Ser. No. 61/403,135, filed on Sep. 9, 2010, U.S. Provisional Patent Application Ser. No. 61/466,177, filed on Mar. 22, 2011, U.S. Provisional Patent Application Ser. No. 61/409,475, filed on Nov. 2, 2010, U.S. Provisional Patent Application Ser. No. 61/403,113, filed on Sep. 9, 2010, U.S. Provisional Patent Application Ser. No. 61/409,478, filed on Nov. 2, 2010, U.S. Provisional Patent Application Ser. No. 61/409,476, filed on Nov. 2, 2010, U.S. Provisional Patent Application Ser. No. 61/409,482, filed on Nov. 2, 2010, U.S. Provisional Patent Application Ser. No. 61/409,470, filed on Nov. 2, 2010, U.S. Provisional Patent Application Ser. No. 61/517,413, filed on Apr. 19, 2011, U.S. Provisional Patent Application Ser. No. 61/468,964, filed on Mar. 29, 2011, U.S. Provisional Patent Application Ser. No. 61/409,487, filed on Nov. 2, 2010, U.S. Provisional Patent Application Ser. No. 61/409,494, filed on Nov. 2, 2010, U.S. Provisional Patent Application Ser. No. 61/456,219, filed on Nov. 2, 2010, U.S. Provisional Patent Application Ser. No. 61/456,221, filed on Nov. 2, 2010, U.S. Provisional Patent Application Ser. No. 61/456,220, filed on Nov. 2, 2010, U.S. Provisional Patent Application Ser. No. 61/432,488, filed on Jan. 13, 2011, U.S. Provisional Patent Application Ser. No. 61/506,572, filed on Jul. 11, 2011, U.S. Provisional Patent Application Ser. No. 61/519,075, filed on May 16, 2011, U.S. Provisional Patent Application Ser. No. 61/519,055, filed on May 16, 2011, U.S. Provisional Patent Application Ser. No. 61/460,573, filed on Jan. 4, 2011, U.S. Provisional Patent Application Ser. No. 61/461,223, filed on Jan. 13, 2011, U.S. Provisional Patent Application Ser. No. 61/429,282, filed on Jan. 3, 2011, U.S. Provisional Patent Application Ser. No. 61/429,289, filed on Jan. 3, 2011, U.S. Provisional Patent Application Ser. No. 61/499,996, filed on Jun. 22, 2011, U.S. Provisional Patent Application Ser. No. 61/575,196, filed on Aug. 17, 2011, and U.S. Provisional Patent Application Ser. No. 61/575,204, filed on Aug. 17, 2011.

Additionally, this patent application hereby incorporates by reference U.S. Pat. No. 5,301,900 issued Apr. 12, 1994 to Groen et al., U.S. Pat. No. 1,947,901 issued Feb. 20, 1934 to J. De la Cierva, and U.S. Pat. No. 2,352,342 issued Jun. 27, 1944 to H. F. Pitcairn.

RIGHTS OF U.S. GOVERNMENT

This invention was made with Government support under Agreement No. HR0011-06-9-0002 awarded by DARPA. The Government has certain rights in the invention.

BACKGROUND

1. The Field of the Invention

This invention relates to rotorcraft and, more particularly, to novel systems and methods for securing rotor blades to a hub on high-advance-ratio rotorcraft.

2. The Background Art

Rotorcraft rely on a rotating wing to provide lift. In contrast, fixed-wing aircraft rely on air flow over a fixed wing to provide lift. Fixed-wing aircraft must therefore achieve a minimum ground velocity on takeoff before the lift on the wing is sufficient to overcome the weight of the plane. Fixed-wing aircraft therefore generally require a long runway along which to accelerate to achieve this minimum velocity and takeoff.

In contrast, rotorcraft can take off and land vertically or along short runways inasmuch as powered rotation of the rotating wing provides the needed lift. This makes rotorcraft particularly useful for landing in urban locations or undeveloped areas without a proper runway.

The most common rotorcraft in use today are helicopters. A helicopter typically includes an airframe, housing an engine and passenger compartment, and a rotor, driven by the engine, to provide lift. Forced rotation of the rotor causes a reactive torque on the airframe. Accordingly, conventional helicopters require either two counter rotating rotors or a tail rotor in order to counteract this reactive torque.

Another type of rotorcraft is the autogyro. An autogyro aircraft derives lift from an unpowered, freely rotating rotor comprising two or more rotor blades. The energy to rotate the rotor results from a windmill-like effect of air passing through the underside of the rotor (i.e., autorotation of the rotor). The Bernoulli effect of the airflow moving over the rotor blade surface creates lift. The forward movement of the aircraft comes in response to a thrusting engine such as a motor driven propeller mounted fore or aft.

During the early years of aviation, autogyro aircraft were proposed to avoid the problem of aircraft stalling in flight and to reduce the need for runways. In autogyro aircraft, the relative airspeed of the rotor blades may be controlled or influenced somewhat independent of the forward airspeed of the autogyro, allowing slow ground speed for takeoff and landing, and safety in slow-speed flight.

Various autogyro devices in the past have provided some means to begin rotation of the rotor prior to takeoff (i.e., prerotation). Prerotation may minimize the takeoff distance down a runway. One type of autogyro is the "gyrodyne." Examples of such aircraft are the XV-1 convertiplane tested in 1954 and the Rotodyne built by Fairey Aviation in 1962. The gyrodyne includes a thrust source providing thrust in a flight direction and a rotor providing autorotative lift at cruising speeds. Jet engines located on the tip of each rotor blade provided rotation of the rotor during takeoff, landing, and hovering.

Although typical rotorcraft provide the significant advantage of vertical takeoff and landing (VTOL), they are much more limited in their maximum flight speed than are fixed-wing aircraft. One reason that prior rotorcraft are unable to achieve high flight speed is a phenomenon known as "retreating blade stall."

In a fixed-wing aircraft, all wings move forward in fixed relation with respect to one another and the airframe. However, as a rotorcraft moves in a flight direction, rotation of the rotor causes each blade thereof to be either "advancing" or "retreating." A blade is advancing if it is moving in the same direction as the flight direction. A blade is retreating if it is moving opposite the flight direction. Thus, the velocity of any point on any blade is the velocity of that point, with respect to the airframe, plus the velocity of the airframe.

Rotor blades are airfoils that provide lift based on the speed of air flow thereover. Accordingly, the advancing blade typically experiences much greater lift than the retreating blade. If left uncheck, this disproportionate lift may render the rotorcraft unflyable. One solution to this problem is allowing the rotor blades to "flap." Flapping enables rotorcraft to travel in a direction substantially perpendicular to the axis of rotation of the rotor.

With flapping, an advancing blade is allowed to fly or flap upward in response to the increased air speed thereover, thereby reducing the blade's angle of attack. This, in turn, reduces the lift generated by the advancing blade. A retreating blade experiences less air speed and tends to fly or flap downward such that its angle of attack is increased. This, in turn, increases the lift generated by the retreating blade. In this manner, flapping balances the lift generated by the advancing and retreating blades.

However, lift equalization due to flapping is limited by retreating blade stall. As noted above, flapping of the rotor blades increases the angle of attack of the retreating blade. At certain higher speeds in the direction of flight, the increase in the blade angle of attack required to equalize lift results in loss of lift (stalling) of the retreating blade.

A second limit on the speed of rotorcraft is the drag at the tips of the rotor blades. The tip of the advancing blade is moving at a speed equal to the speed of the aircraft relative to the surrounding air, plus the speed of the tip of the blade with respect to the aircraft. Thus, the speed at the tip of an advancing blade is equal to the sum of the flight speed of the rotorcraft plus the product of the length of the blade and the angular velocity of the rotor.

In helicopters, the rotor must rotate to provide both upward lift and thrust in the direction of flight. Increasing the speed of a helicopter increases the air speed at the tip, both because of the increased flight speed as well as the increased angular velocity of the rotors required to provide supporting thrust. The speed at the tip of the advancing blade could therefore approach the speed of sound, even when the flight speed of the rotorcraft was actually much less. As the air speed over the tip approaches the speed of sound, the drag on the blade becomes greater than the engine can overcome. Accordingly, helicopters are quite limited in how fast they can fly.

In autogyro aircraft, the tips of the advancing blades are also subject to this increased drag, even for flight speeds much lower than the speed of sound. The tip speed for an autogyro is typically smaller than that of a helicopter, for a given airspeed, since the rotor is not driven. Nevertheless, the same drag increase occurs eventually.

A third limit on the speed of rotorcraft is reverse air flow over the retreating blade. As noted above, the retreating blade is traveling opposite the flight direction with respect to the airframe. At certain high speeds in the direction of flight, portions of the retreating blade may move rearward, with respect to the airframe, slower than the flight speed of the airframe. Accordingly, the direction of air flow over those portions of the retreating blade is reversed from that typically designed to generate positive lift.

Rather then generating positive lift, reverse air flow may impose negative lift, or a downward force, on the retreating blade. That is, an airfoil with positive angle of attack in a first direction has a negative angle of attack in a second direction, opposite the first direction.

The ratio of air speed of a rotorcraft in the direction of flight to the maximum corresponding air speed at the tips of the rotor blades is known as the "advance ratio."

The maximum advance ratio of currently available rotorcraft is less than 0.5. For most helicopters, the maximum achievable advance ratio is between about 0.3 and 0.4. Accordingly, current rotorcraft are limited to a top flight speed of about 200 miles per hour (mph) or less.

In view of the foregoing, it would be an advancement in the art to provide a rotorcraft capable of vertical takeoff and landing and flight speeds well in excess of 200 mph.

BRIEF SUMMARY OF THE INVENTION

In view of the foregoing, in accordance with the invention as embodied and broadly described herein, a method and apparatus are disclosed in one embodiment of the present invention as including a rotor of a rotorcraft. In selected embodiments, a rotor may define axial, radial, and circumferential directions. The rotor may include a hub with two or more rotor blades, each extending in a radial direction away therefrom. A feathering spindle in accordance with the present invention may provide an interface between a hub and a rotor blade.

In selected embodiments, a feathering spindle may secure a rotor blade rigidly to the hub with respect to certain directions or degrees of freedom. For example, a feathering spindle may prevent or resist translation in a radial direction, translation in the axial direction, and rotation about an axis extending in the axial direction of a rotor blade pivotal with respect to a hub. This rigidity may provide predictable communication of various loads (e.g., centrifugal, lift, flapping, lead, lag, vibration loads, and the like) from the rotor blade to the hub, where some or all of the loads may be resolved.

A feathering spindle may also permit and facilitate certain motion between a rotor blade and a hub. Specifically, a feathering spindle may support feathering of a rotor blade. That is, a feathering spindle may permit and facilitate rotation of a rotor blade with respect to a hub about an axis extending in the radial direction. Accordingly, a feathering spindle may enable adjustments to the pitch (i.e., angle of attack) of a rotor blade.

In selected embodiments, a rotor blade may include a tip jet (i.e., a small jet engine located proximate the tip of the rotor blade) for powering rotation of a rotor during takeoff, landing, hovering, etc. When thrust from the tip jet is needed, compressed air may be fed to the tip jet from an interior conduit in the corresponding rotor blade. This interior conduit may extend from the root to the tip of the rotor blade. For example, a feathering spindle and corresponding rotor blade in accordance with the present invention may be configured to allow the flow of compressed air through the feathering spindle and down an interior conduit of a rotor blade to the tip jet. In certain embodiments, a hub may even act as a manifold, feeding compressed air into the interior conduits of the various rotor blades.

A feathering spindle may include one or more bearings forming an interface between the rest of the feathering spindle and a corresponding hub. In certain embodiments, a feathering spindle may include two bearings. A feathering spindle may further include a tensioning sleeve. The tensioning sleeve may support the inner races of the two bearings. The outer races of the two bearings may engage the hub. The bearings may be preloaded by a preload mechanism (e.g., a threaded nut) engaging the tensioning sleeve.

A rotorcraft in accordance with the present invention may include an oil circulation system. The system may pass oil through an annular cavity defined by and between the hub and feathering spindle. Oil in the annular cavity may lubricate the bearings of the feathering spindle. The oil may also regulate the temperature of the various parts of a feathering spindle. For example, a feathering spindle may be either cooled or warmed by the oil as appropriate for the environmental conditions and need for dimensional stability of components.

Seals in dual configurations at each end of a feathering spindle may keep the oil in the annular cavity. Drain holes between such dual or double seals may ensure against leaks into the inside of the hub or to the environment outside, as any such leak may present a potential fire hazard.

In certain embodiments, a selected amount of warm air may be bled into a hub and pass through the corresponding feathering spindles and rotor blades. This warm air may aid in maintaining a feathering spindle and surrounding components within a desired temperature range. Additionally, the warm air may provide anti-icing capabilities for the rotorcraft.

In selected embodiments, the root of a rotor blade may be positioned and secured within a feathering spindle. One or more protective bands fitted onto the root of a rotor blade may form an interface between the rotor blade and the corresponding feathering spindle. The material selected for the protective bands may have a similar coefficient of thermal expansion as the material (e.g., carbon composite) forming the rotor blade.

The root of a rotor blade may include an array of bolts (e.g., tension studs with threaded ends) extending in the radial direction. A thrust flange of a feathering spindle may include an array of apertures. Each aperture of the array may be sized and positioned to receive a corresponding bolt. Once each bolt has been inserted within a corresponding aperture, one or more washers (e.g., centering or convex washers) may be installed on each bolt. Next, threaded fasteners may be applied to the bolts. Tightening of the fasteners may secure the rotor blade to and register it with respect to the feathering spindle.

BRIEF DESCRIPTION OF THE DRAWINGS

The foregoing features of the present invention will become more fully apparent from the following description and appended claims, taken in conjunction with the accompanying drawings. Understanding that these drawings depict only typical embodiments of the invention and are, therefore, not to be considered limiting of its scope, the invention will be described with additional specificity and detail through use of the accompanying drawings in which:

DETAILED DESCRIPTION OF SELECTED EMBODIMENTS

Figure 1:
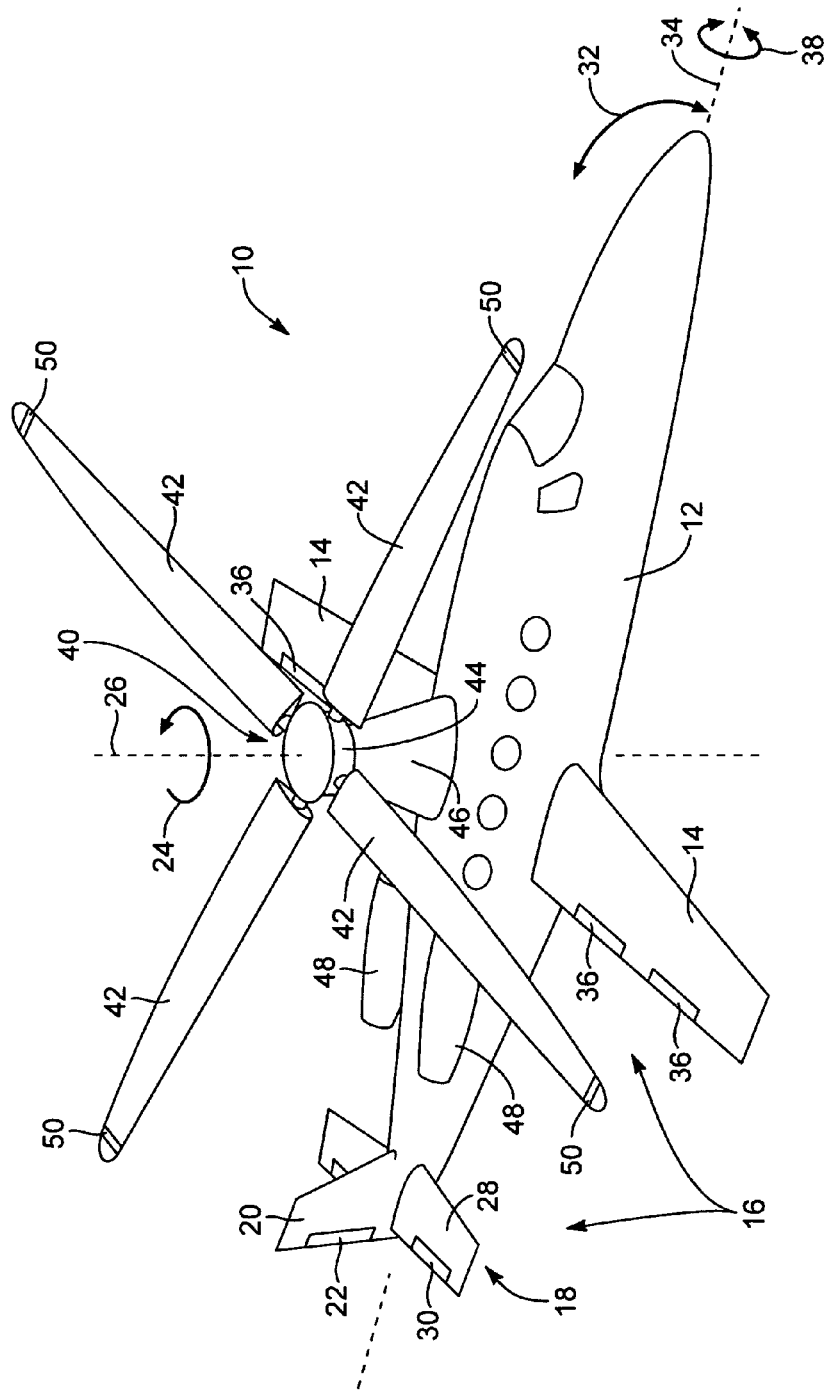
FIG. 1 is a perspective view of a rotorcraft in accordance with one embodiment of the present invention.

It will be readily understood that the components of the present invention, as generally described and illustrated in the drawings herein, could be arranged and designed in a wide variety of different configurations. Thus, the following more detailed description of the embodiments of the system and method of the present invention, as represented in the drawings, is not intended to limit the scope of the invention, as claimed, but is merely representative of various embodiments of the invention. The illustrated embodiments of the invention will be best understood by reference to the drawings, wherein like parts are designated by like numerals throughout.

Referring to FIG. 1, a rotorcraft 10 in accordance with the present invention may include an airframe 12 defining a cabin for carrying an operator, passengers, cargo, or the like. The airframe 12 may include one or more fixed wings 14 or airfoils 14 providing lift to the rotorcraft 10. The wings 14 may be configured such that they provide sufficient lift to overcome the weight of the rotorcraft 10 (or any significant portion thereof) only at comparatively high speeds.

That is, a rotorcraft 10 may be capable of vertical takeoff and landing (VTOL) and may not need lift from the fixed wings 14 at low speeds (e.g., below 50 mph or even 100 mph). Accordingly, the wings 14 may be made smaller than those of fixed-wing aircraft requiring a high velocity takeoff. The smaller wings 14 may result in lower drag at higher velocities. In some embodiments, the wings 14 may provide sufficient lift to support at least 50 percent, preferably about 90 percent, of the weight of the rotorcraft 10 at air speeds above 200 mph.

Control surfaces 16 may form part of an airframe 12. For example a tail structure 18 may include one or more vertical stabilizers 20 and one or more rudders 22. The rudders 22 may be adjustable to control yaw 24 of the rotorcraft 10 during flight. As known in the art, yaw 24 is defined as rotation about a vertical axis 26 of the rotorcraft 10. In the illustrated embodiment, the rudders 22 may comprise hinged portions of the vertical stabilizers 20.

The tail structure 18 may further include a horizontal stabilizer 28 and an elevator 30. The elevator 30 may be adjustable to alter pitch 32 of the rotorcraft 10. As known in the art, pitch 32 is defined as rotation about an axis extending laterally with respect to the airframe 10. In the illustrated embodiment, the elevator 30 is a hinged portion of the horizontal stabilizer 28. In some embodiments, twin rudders 22 may be positioned at an angle relative to the vertical axis 26 and serve both to adjust or control yaw 24 and pitch 32 of the rotorcraft 10.

The control surfaces 16 may also include ailerons 36 on the wings 14. Ailerons 36 may be used to control roll 38 of the airplane. As known in the art, roll 38 is defined as rotation about the longitudinal axis 34 of the rotorcraft 10.

Lift during vertical takeoff and landing, and for augmenting lift of the wings 14 during flight, may be provided by a rotor 40. A rotor 40 may comprise a number of individual rotor blades 42 extending radially away from a hub 44. The hub 44 may be coupled to a mast 46. The mast may extend to connect the hub 44 to the rest of the airframe 12.

Figure 2:
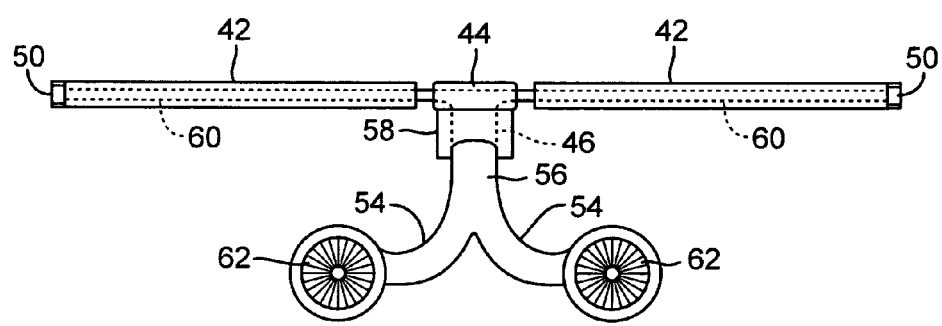
FIG. 2 is a schematic front elevation view of a compressed or otherwise pressurized air supply for tip jets in accordance with one embodiment of the present invention.

Referring to FIG. 2, a rotor 40 may be coupled to one or more engines 48 housed in a fuselage portion of the airframe 12 or in one or more adjacent nacelles. The engines 48 may provide thrust during flight of the rotorcraft 10. The engines 48 may also generate compressed air for the tip jets 50.

For example, in selected embodiments, the engines 48 may comprise one or more bypass turbines 62. All or a portion of the bypass air from the turbines 62 may be directed to the tip jets 50. Alternatively, the engines 48 may drive one or more auxiliary compressors, which in turn may provide the compressed air for the tip jets 50. Using the compressed air, the tip jets 50 may power the rotor 40 during takeoff, landing, hover or whenever the flight speed of the rotorcraft 10 is too low for sufficient lift from autorotation of the rotor 40.

In selected embodiments, the compressed air generated by the engines 48 may be conducted to the tip jets 50 via one or more ducts 54. For example, bypass air from one or more bypass turbines 62 may be transmitted through ducts 54 to a plenum 56. The plenum 56 may be in fluid communication with a mast 46 that is hollow or has another passage to provide for air conduction. For example, a mast fairing 58 positioned around the mast 46 may provide one or both of an air channel and a low drag profile for the mast 46. The mast 46 or mast fairing 58 may be in fluid communication with a hub 44.

Finally, the hub 44 may be in fluid communication with an interior conduit 60 within each of the various rotor blades 42. Accordingly, the compressed air may travel radially within the interior conduits 60 to feed the corresponding tip jets 50.

Figure 3:
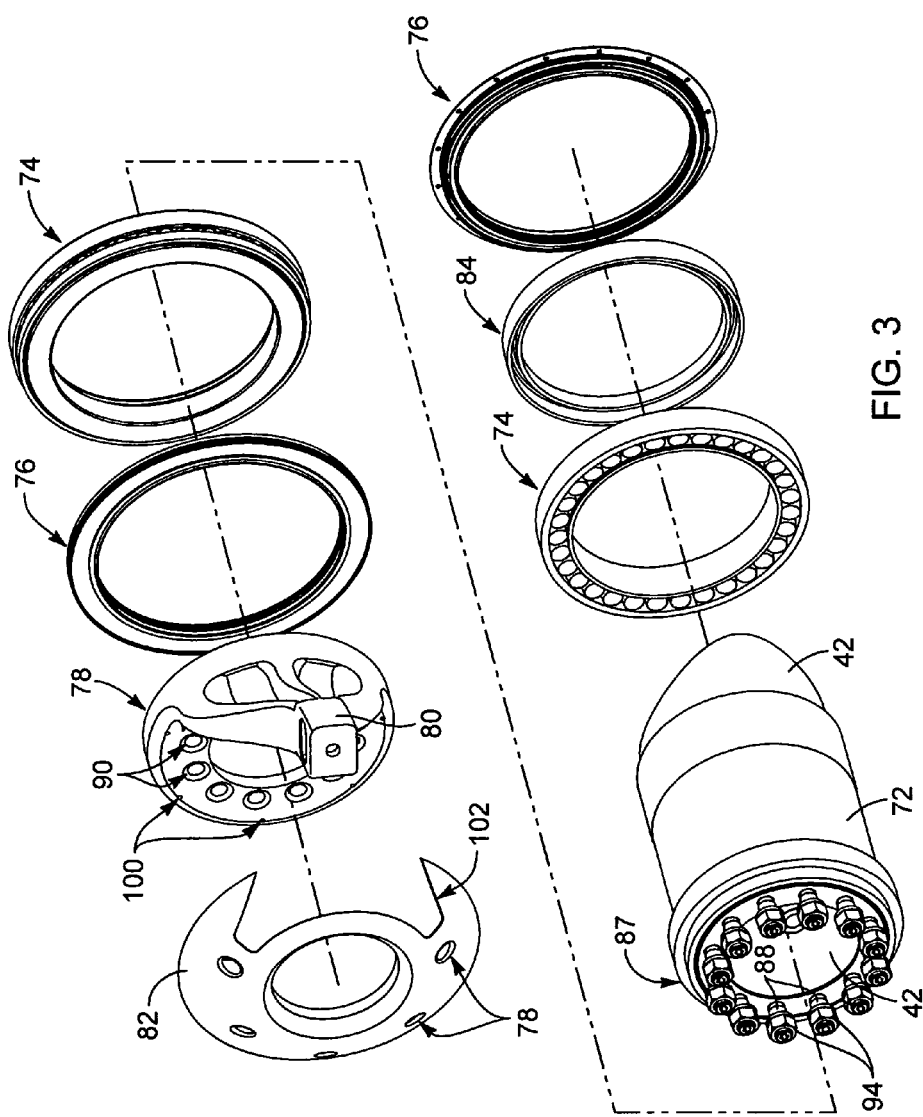
FIG. 3 is a perspective, exploded view of one embodiment of a feathering spindle in accordance with the present invention.
Figure 4:
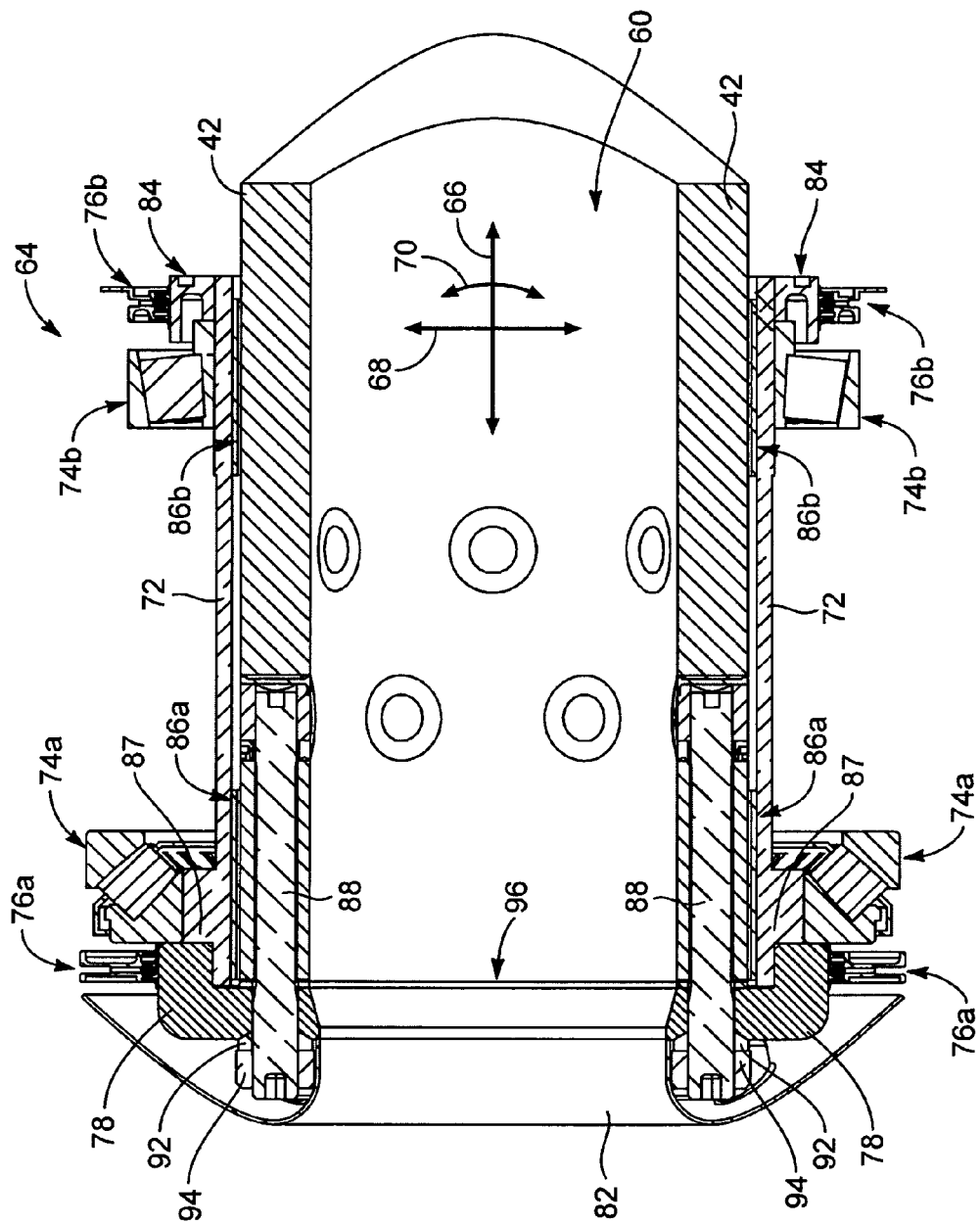
FIG. 4 is a side, cross-sectional view of the feathering spindle of FIG. 3.

Referring to FIGS. 3 and 4, a feathering spindle 64 in accordance with the present invention may provide an interface between a hub 44 and a rotor blade 42. In selected embodiments, a feathering spindle 64 may secure a rotor blade 42 rigidly to the hub 44 with respect to certain directions or degrees of freedom. For example, a feathering spindle 64 may prevent or resist translation in the radial direction 66, translation in the axial direction 68, rotation about an axis extending in the axial direction 68, and rotation 70 about an axis orthogonal to the axial direction 68, etc. of a rotor blade 42 with respect to a hub 44. This rigidity may provide predictable communication of various loads (e.g., centrifugal, lift, flapping, lead, lag, vibration loads, and the like) from the rotor blade 42 to the hub 44, where some or all of the loads may be resolved.

A feathering spindle 64 may also permit and facilitate certain motions between a rotor blade 42 and a hub 44. Specifically, a feathering spindle 64 may support feathering of a rotor blade 42. That is, a feathering spindle 64 may permit and facilitate pivoting of a rotor blade 42 with respect to a hub 44 about an axis extending in the radial direction 66 of the hub 44, the axial direction of the blade 42. Accordingly, a feathering spindle 64 may enable adjustments to the pitch (i.e., angle of attack) of a rotor blade 42.

In selected embodiments, a tensioning sleeve 72 may form the backbone of a feathering spindle 64. Accordingly, a tensioning sleeve 72 may provide the base component to which the other components of a feathering spindle 64 may secure. Other components of a feathering spindle 64 may include one or more bearings 74 (e.g., thrust bearings), one or more seals 76, a thrust flange 78, a pitch arch 80, a fairing 82, and a preload mechanism 84.

The bearings 74 of a feathering spindle 64 may form the interface between a tensioning sleeve 72 and a hub 44. The bearings 74 may enable the tensioning sleeve 72 to rotate with respect to the hub 44 about an axis extending in the radial direction 66. In selected embodiments, the bearings 74 may comprise a first bearing 74a and a second bearing 74b. The inner races of the first and second bearings 74a, 74b may rest on or engage the tensioning sleeve 72. The outer races of the first and second bearings 74a, 74b may rest on or engage the hub 44. In selected embodiments, the first and second bearings 741, 74b may each comprise a tapered roller bearing.

A preload mechanism 84 may control the amount of force urging the first and second bearings 74a, 74b toward one another. Accordingly, a preload mechanism 84 may control the amount of force with which a portion of the hub 44 is clamped between the first and second bearings 74a, 74b. In selected embodiments, a preload mechanism 84 may comprise a threaded fastener 84 or nut 84 threadedly engaging an end of a tension sleeve 72.

As the threaded fastener 84 advances onto the tensioning sleeve 72, the distance between the first and second bearings 74a, 74b may decrease. Once a hub 44 resists or prevents further decreases in the distance between the first and second bearings 741, 74b, further rotation of the threaded fastener 84 may generate a preload clamping a portion of the hub 44 between the first and second bearings 74a, 74b.

The root of a rotor blade 42 may be positioned and secured within a feathering spindle 64. For example, in selected embodiments, a tensioning sleeve 72 of a feathering spindle 64 may define an interior cavity extending in the radial direction 66 therethrough. The tensioning sleeve 72 may receive (e.g., coaxially) the root of the rotor blade 42 within this interior cavity. One or more protective bands 86a, 86b may be fitted or bonded onto the root of a rotor blade 42 and form an interface between rotor blade 42 and an interior surface of a corresponding tensioning sleeve 72.

The material selected for the protective bands 86a, 86b may have a similar coefficient of thermal expansion to that of the material (e.g., carbon composite) forming the rotor blade 42. In certain embodiments, the bands 86a, 86b may be formed of steel. Each band 86a, 86b may comprise multiple segments (e.g., four quarter segments) to facilitate manufacture, installation, or the like. Alternatively, each band 86a, 86b may comprise a single monolithic unit.

A thrust flange 78 may provide a location for a rotor blade 42 to engage a feathering spindle 64. A thrust flange 78 may further provide a mechanism for transferring loads from the rotor blade 42 (e.g., centrifugal loads) through the bearings 74a to the hub 44. Additionally, a thrust flange 78 may provide a mechanism for communicating pitch controls (e.g., changes in pitch) to a rotor blade 42.

A thrust flange 78 may be connected to a tensioning sleeve 72 in any suitable manner. In selected embodiments, a thrust flange 78 may be connected to a tensioning sleeve 72 via a threaded engagement therebetween. In such embodiments, a tensioning sleeve 72 may include a shoulder 87 against which a thrust flange 78 may abut once a proper engagement between the tensioning sleeve 72 and thrust flange 78 is achieved or reached.

In certain embodiments, the shoulder 87 may provide a location for the inner race of a first bearing 74a to engage or contact the tensioning sleeve 72. Accordingly, a thrust flange 78 may contact the first bearing 74a and transfer loads to an inner race thereof. With the outer race of the first bearing 74a contacting and abutting a portion of the hub 44, the first bearing 74a may transfer or communicate the loads imposed thereon to the hub 44, where they may be resolved.

The root of a rotor blade 42 may include an array of bolts 88 (e.g., tension studs threaded at both ends) extending in the radial direction 66. A thrust flange 78 may include an array of apertures 90. Each aperture 90 of the array may be sized and positioned to receive a corresponding bolt 88. Once each bolt 88 has been inserted within a corresponding aperture 90, one or more washers 92 (e.g., centering or convex washers) may be installed on each bolt 88. The convex washer 92 may ensure that the corresponding bolt 88 is centered in the aperture 90 of the thrust flange 78. Next, threaded fasteners 94 may be applied to the bolts 88. Tightening of the fasteners 94 may secure the rotor blade 42 to the feathering spindle 64.

In certain embodiments, an interface ring 96 may be placed between the end of a rotor blade 42 and the corresponding thrust flange 78. The interface ring 96 may be formed of compliant material. Alternatively, the interface ring 96 may comprise a bearing plate 96 formed of composite material bonded onto the root of the rotor blade 42. Accordingly, the interface ring 96 may remove or relieve any stress risers (e.g., direct loading of certain composite fibers especially in a very narrow region) that may otherwise result from irregularities in the end of the rotor blade 42, the corresponding abutting surface of the thrust flange 78, or both.

In selected embodiments, a thrust flange 78 in accordance with the present invention may have a pitch arm 80 connected thereto or monolithically formed therewith. A pitch arm 80 may provide a location and appropriate leverage to control the pitch of a rotor blade 42 connected thereto. One or more control mechanisms may engage or connect to an end of a pitch arm 80 and impart motion thereto. In certain embodiments, this motion may be primarily linear. A pitch arm 80 may convert such linear motion into pivoting of the corresponding rotor blade 42 with respect to the hub 44 about an axis extending in the radial direction 66.

A feathering spindle 64 and corresponding rotor blade 42 in accordance with the present invention may be configured to allow the flow of compressed air through the feathering spindle 64 and into an interior conduit 60 of the rotor blade 42. A feathering spindle 64 may include a fairing 82 to ease or smooth the flow of air into the interior conduit 60 of the rotor blade 42. In addition to reducing the drag imposed on the flow of air, the fairing 82 may also shield, to a certain extent, the thrust flange 78 and other components of a feathering spindle 64 (e.g., a first seal 76a) from the heat of the flow of compressed air.

A fairing 82 in accordance with the present invention may include various apertures 98 facilitating securement of the fairing 82 to a thrust flange 78. The apertures 98 may be countersunk so that any fasteners extending therethrough may not interrupt the generally smooth exterior surface exhibited by the fairing 82. In selected embodiments, threaded fasteners may extend through the apertures 98 to engage corresponding threaded apertures 100 formed in the thrust flange 78. A fairing 82 may also include an aperture 102 or notch 102 enabling the pitch arm 80 to extending past or through the fairing 82 into the interior of the corresponding hub 44.

One or more seals 76 may define an enclosed cavity between a feathering spindle 64 and a hub 44. In selected embodiments, a feathering spindle 64 may include two seals 76a, 76b. A first seal 76a may be positioned proximate or extend from a thrust flange 82. A second seal 76b may be positioned proximate or extend from a preload mechanism 84. Each seal 76a, 76b may comprise a double seal with a drain hole located therebetween. The seals 76a, 76b may prevent any oil from inadvertently escaping the enclosed cavity.

Figure 5:
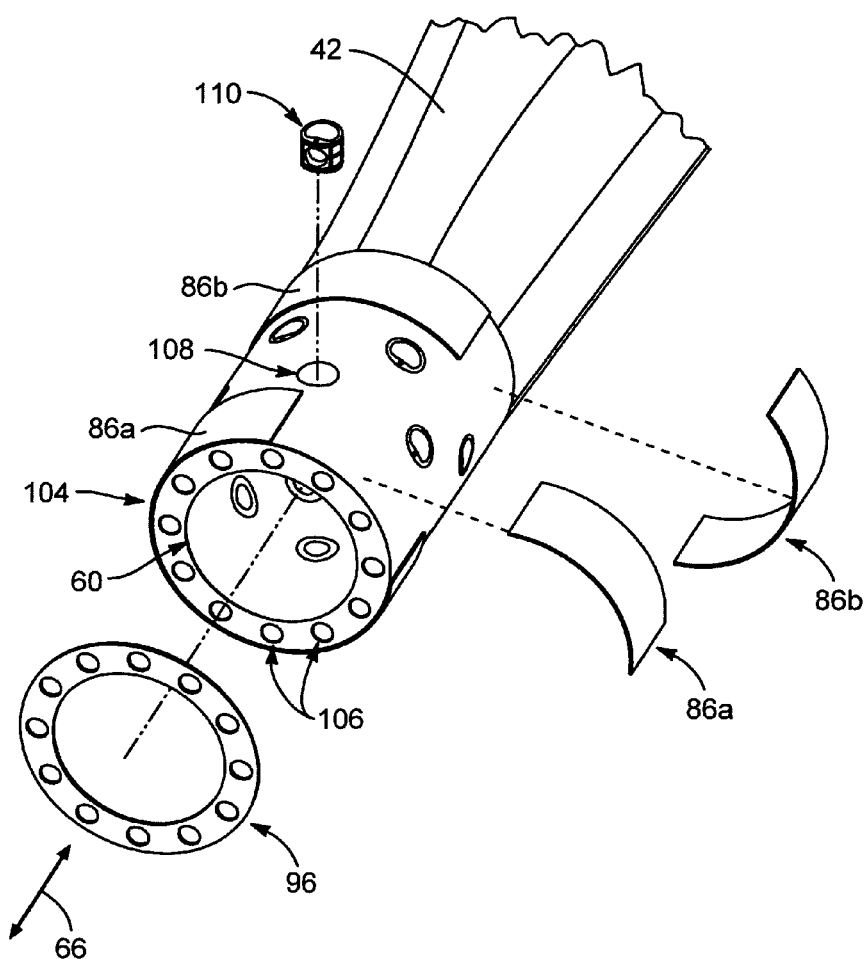
FIG. 5 is a perspective, exploded view of one embodiment of a blade root in accordance with the present invention.

Referring to FIG. 5, the root of a rotor blade 42 may comprise a wall forming a hollow circular cylinder 104. The cylinder 104 may form or define part of the interior conduit 60 of the rotor blade 42. In selected embodiments, the wall forming the cylinder 104 may include various apertures 106, 108 facilitating or enabling engagement with the outboard ends of the various bolts 88.

For example, in certain embodiments, the wall may include therewithin an array of axial apertures 106. While the axial apertures 106 may extend in the radial direction 66 with respect to the rotor 40, they may extend in an axial direction with respect to the cylinder 104. The axial apertures 106 may be evenly and circumferentially distributed about the cylinder 104. The length of the apertures 106 (i.e., the depth of penetration of the axial apertures 106 in the radial direction 66 into the wall of the root) may vary according to the length of the bolt 88 to be received therein.

The outboard end of each axial aperture 66 may open into a radial aperture 108. While the radial apertures 108 may not extend in the radial direction 66 with respect to the rotor 40, they may extend radially with respect to the cylinder 104. The radial apertures 108 may penetrate radially through the cylinder 104 from the exterior of the rotor blade 42 to the interior conduit 60. A liner 110 may be bonded or otherwise secured within each radial aperture 108.

Figure 6:
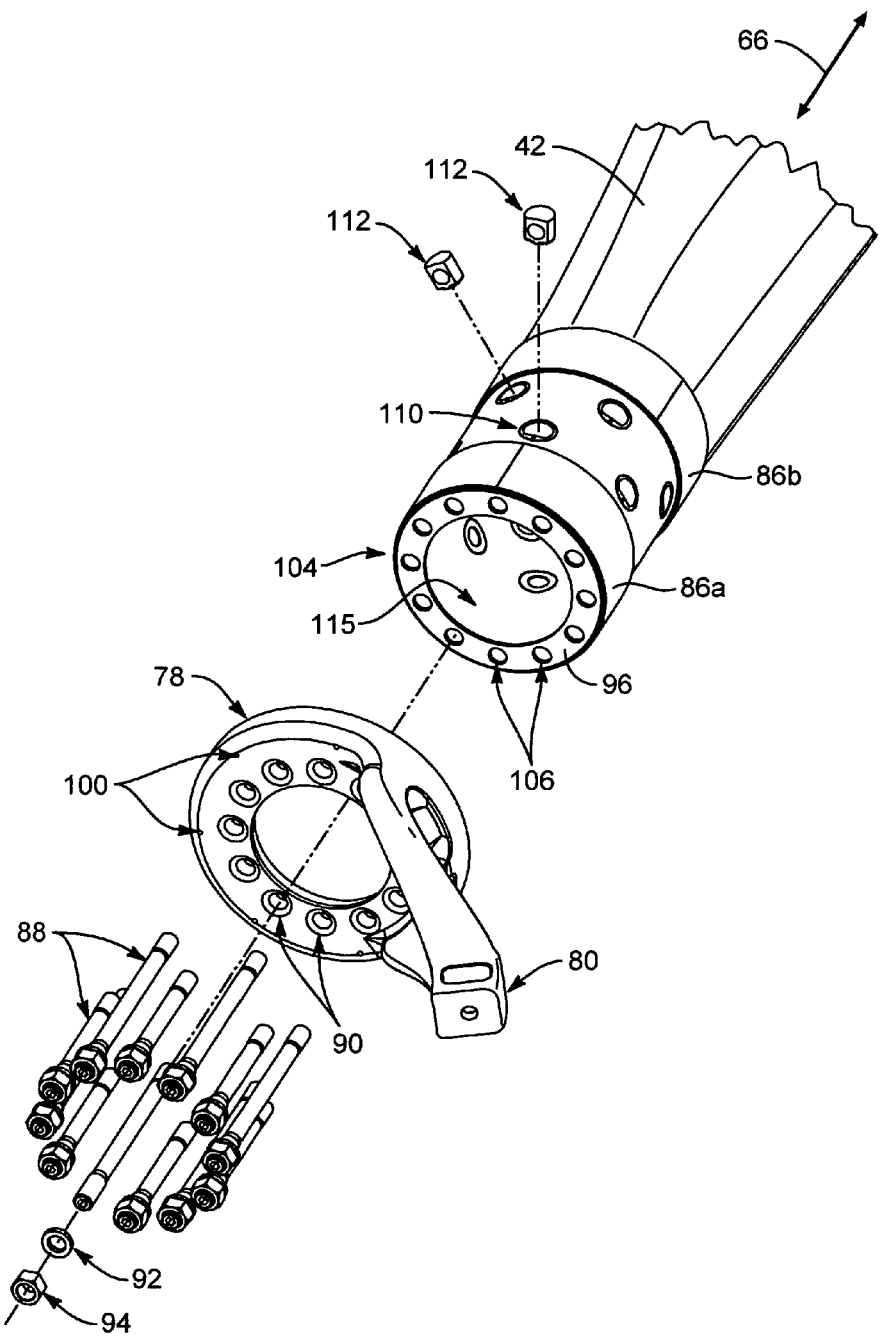
FIG. 6 is a perspective, exploded view of one embodiment of a blade root and thrust flange interface in accordance with the present invention.
Figure 7:
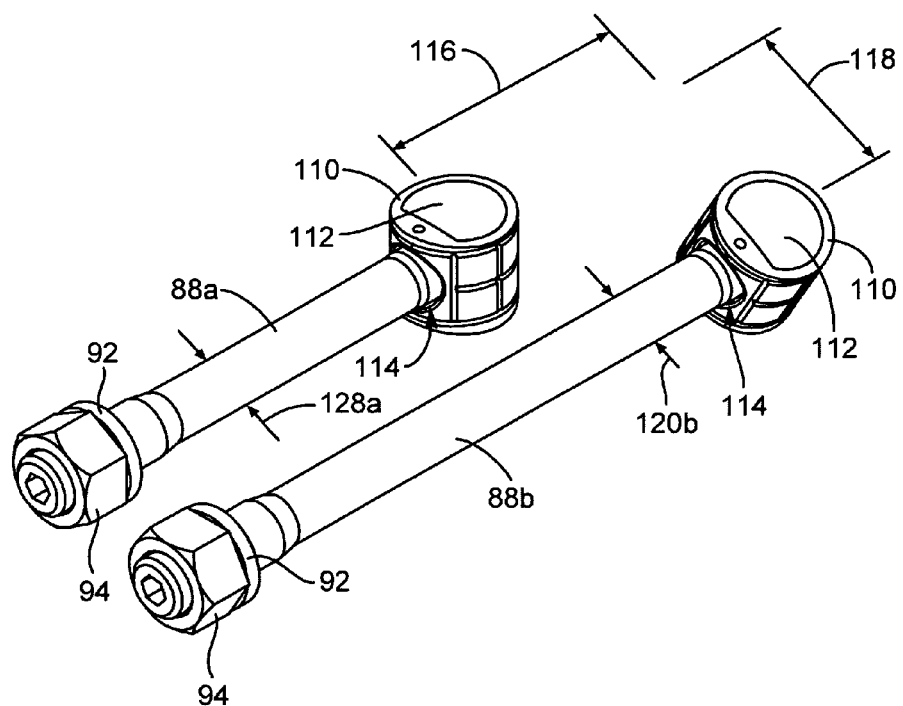
FIG. 7 is a perspective view of one embodiment of adjacent bolts and corresponding fasteners for securing a blade root to a thrust flange in accordance with the present invention.
Figure 8:
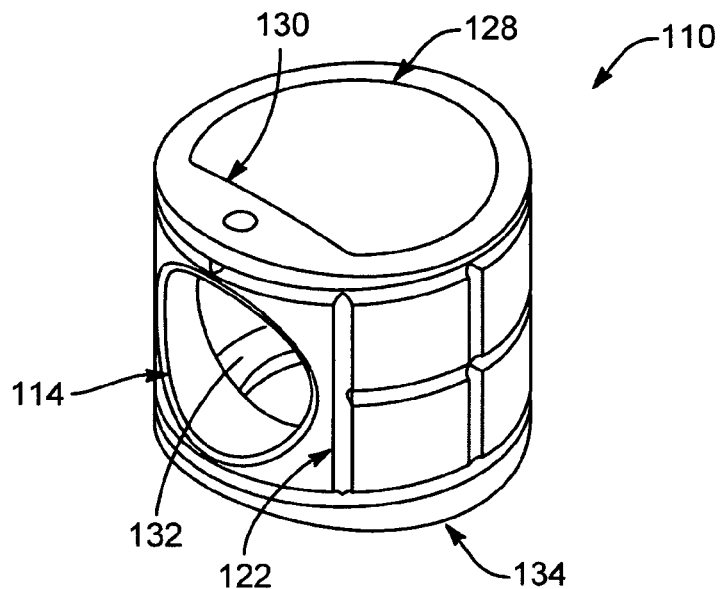
FIG. 8 is a perspective view of one embodiment of a liner for receiving a barrel nut in accordance with the present invention.
Figure 9:
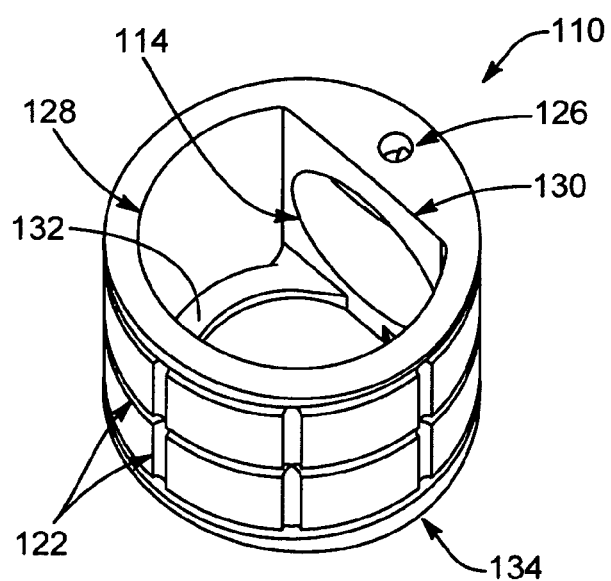
FIG. 9 is another perspective view of the liner of FIG. 8.
Figure 10:
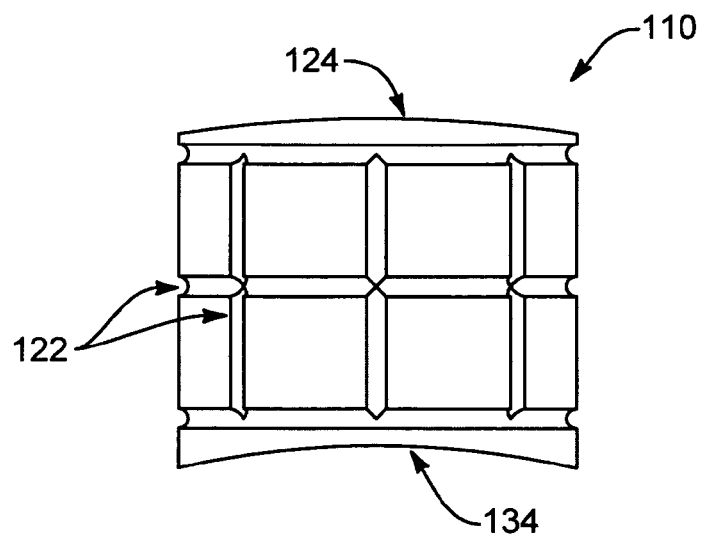
FIG. 10 is a back (e.g., outboard to inboard), elevation view of the liner of FIG. 8.
Figure 11:
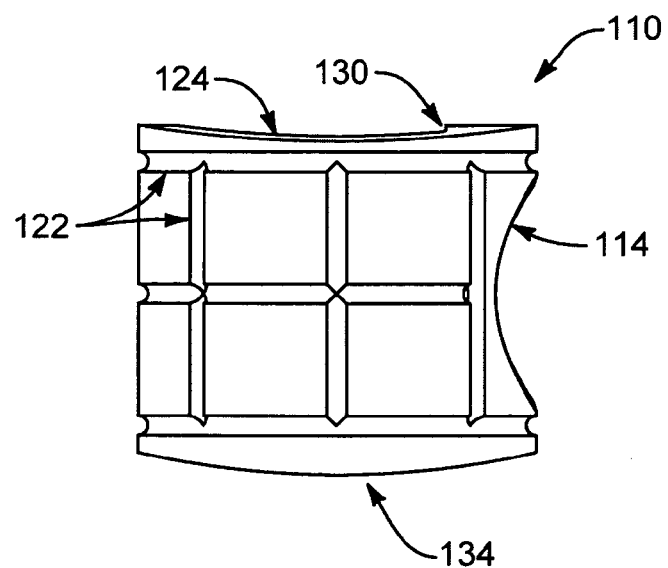
FIG. 11 is a side, elevation view of the liner of FIG. 8.
Figure 12:
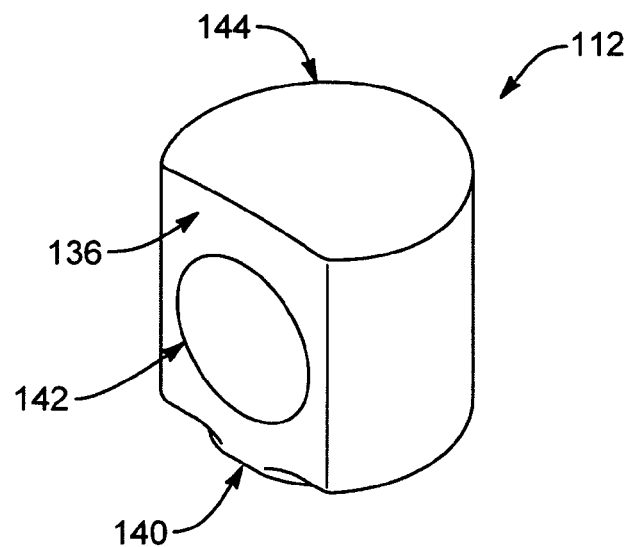
FIG. 12 is a perspective view of one embodiment of a barrel nut in accordance with the present invention.
Figure 13:
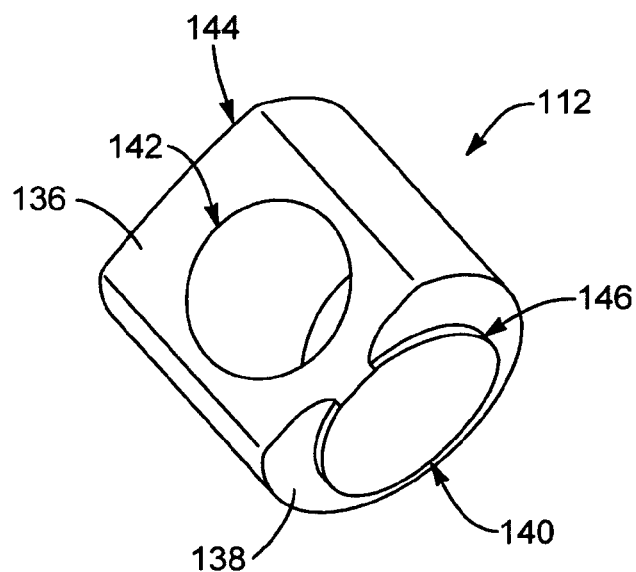
FIG. 13 is another perspective view of the barrel nut of FIG. 12.
Figure 14:
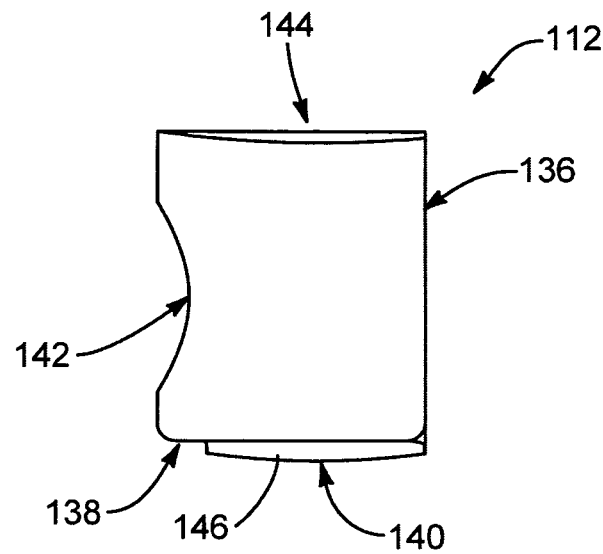
FIG. 14 is a side, elevation view of the barrel nut of FIG. 12.
Figure 15:
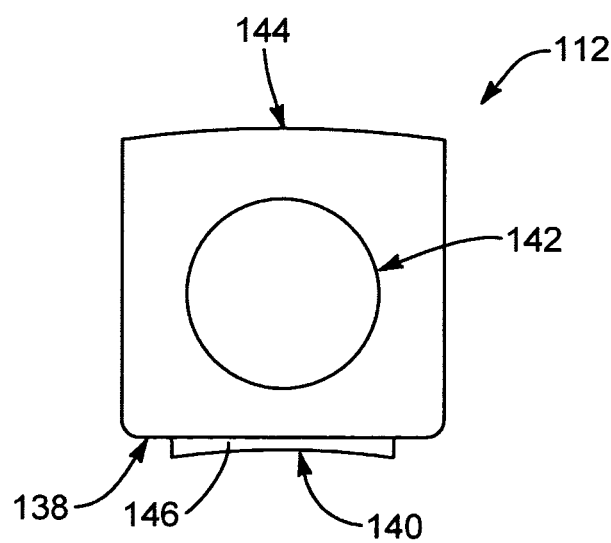
FIG. 15 is a back (e.g., outboard to inboard), elevation view of the barrel nut of FIG. 12.

Referring to FIGS. 6 and 7, a liner 110 may be shaped to receive a barrel nut 112 therewithin. Accordingly, in selected embodiments, a bolt 88 may extend in the radial direction 66 through an aperture 90 in a thrust flange 78, through an aperture in an interface ring 96, through an axial aperture 106 formed within the root of the rotor blade, and into a radial aperture 108 within the root of the rotor blade 42. Within a radial aperture 108, a bolt 88 may pass through an aperture 114 in a liner 110 to engage (e.g., threadedly engage) a barrel nut 112 housed within the liner 110.

When properly tightened, the various bolts 88 and corresponding fasteners 94, 112 may rigidly secure a rotor blade 42 to a thrust flange 78. Accordingly, the bolts 88 may transfer loads (e.g., centrifugal loads) from the rotor blade 42 into the thrust flange 78. Additionally, the bolts 88 may enable a pitch arm 80 to communicate pitch adjustments to the rotor blade 42.

In selected embodiments, certain of the bolts 88 may differ from others in some physical dimension. For example, certain bolts 88a may have one length, while other bolts 88b may have another length that is longer by some margin 116. The bolts 88 and corresponding apertures 106, 108 may be configured such that the bolts 88a, 88b alternate around the cylinder 104. That is, a shorter bolt 88a may be positioned between two adjacent longer bolts 88b and vice versa. The alternating pattern may help maintain adequate sectional areas of blade material at the root of the rotor blade 42.

By controlling or balancing the number of bolts 88, a difference 116 in length between various bolts 88 (e.g., neighboring bolts 88a, 88b), spacing 118 between the bolts 88, and certain other factors, the structural properties of the interface between the root of a rotor blade 42 and a corresponding thrust flange 78 may be tailored to meet specific requirements. In the illustrated embodiment, the structural requirements of the root and thrust flange 78 interface may be satisfied with twelve bolts 88. Half the bolts 88a may be substantially identical to one another and have a length of about 6.9 inches. The other half of the bolts 88b may be substantially identical to one another and have a length of about 9.7 inches.

In certain embodiments, it may be desirable to achieve equivalent axial stiffness between bolts 88 of different lengths and thus equal loading (e.g., mechanical stress) and fatigue life. This may be accomplished by varying the diameter 120 between bolts 88 of different lengths. For example, longer bolts 88b may have a diameter 120b greater than the diameter 120a of shorter bolts 88a. Alternatively, or in combination with varying diameters 120, certain bolts 88 may have different torque specifications. For example, bolts 88b that are longer and wider may have a higher torque specification that those 88a that are shorter and thinner. Accordingly, the mechanical stresses in all the various bolts 88 may be substantially uniform.

Bolts 88, washers, 92, fasteners 94, liners 110, barrel nuts 112, etc. may be formed of any suitable material or combination of materials. In certain embodiments, suitable materials may be selected based at least in part on the environment in which the corresponding component must operate.

For example, the flow of compressed air passing through a cylinder 104 may be at a temperature of about 205 degrees Celsius (400 degrees Fahrenheit). Accordingly, the compressed air may heat the cylinder 104 and surrounding components during the time the rotor 40 is powered.

In selected embodiments, a layer of thermal insulation may be applied to the surface 115 of the interior conduit 60 formed within a rotor blade 42. The layer may protect the rotor blade 42 from the high temperature of the compressed air passing therethrough and reduce the rate at which heat flows from the compressed air into the feathering spindle 64 and surrounding components.

Additionally, the bolts 88, washers 92, fasteners 94, liners 110, barrel nuts 112, etc. that may be exposed to this heat may be formed of a material that performs well (e.g., maintains desired strength, fatigue life, etc.) at such temperatures and such sustained temperatures. In selected embodiments, the bolts 88, washers 92, fasteners 94, liners 110, barrel nuts 112, etc. may be formed of INCONEL 718 or the like.

Referring to FIGS. 8-11, to avoid direct loading of the composite-fiber ends of a rotor blade 42, a liner 110 may be inserted and secured within each of the radial apertures 108. In selected embodiments, to facilitate securement of a liner 110 within a radial aperture 108, the liner 110 may include a network of grooves 122 formed on its exterior surface. A top surface 124 may include a sprue aperture 126 extending within the liner 110 and accessing the network of grooves 122. Once a liner 110 is properly positioned within a radial aperture 108, bonding material may be injected into the sprue aperture 126. The network of grooves 122 may distribute the bonding material to effect a substantially void-free bond.

A liner 110 may include an aperture 114 allowing passage of a bolt 88 therethrough. A liner 110 may also include an aperture 128 for receiving a barrel nut 112. This aperture 128 may include one or more features 130, 132 for indexing a barrel nut 112 therewithin, distributing loads, or some combination thereof. For example, the aperture 128 may include a flat surface 130 configured to abut a corresponding surface of a barrel nut 122. Additionally, the aperture 128 may include at one end thereof a ledge 132 or platform 132 against which a barrel nut 112 may rest. The platform 132 may hold a barrel nut 122 in place before or during installation of a corresponding bolt 88.

In selected embodiments, the top and bottom surfaces 124, 134 of a liner 110 may be contoured. For example, the top and bottom surfaces 124, 134 may be contoured to match the curvature of the cylinder 104. Accordingly, once installed, a liner 110 may be flush with both the interior and exterior surfaces of a cylinder 104.

Referring to FIG. 12-15, a barrel nut 112 may include one or more features 136, 138 for indexing the barrel nut 112 within a liner 110, distributing loads, or some combination thereof. For example, the exterior surface of a barrel nut 112 may include a flat surface 136 configured to abut a corresponding surface 130 of a liner 110. Additionally, a bottom surface 140 of a barrel nut 112 may include a relief 138 formed therein to accommodate the ledge 132 or platform 132 of a liner 110.

A barrel nut 112 may include an aperture 142 extending therethrough. The aperture 142 may be configured to receive and retain an end of a bolt 88. In selected embodiments, the aperture 142 may be threaded to threadedly engage an outboard end of a bolt 88.

The top and bottom surfaces 144, 140 of a barrel nut 112 may be contoured. For example, the top and bottom surfaces 144, 140 may be contoured to match the curvature of the cylinder 104. Accordingly, once installed, a barrel nut 112 may be flush with both the interior and exterior surfaces of a cylinder 104. For example, in the illustrated embodiment, a circular portion 146 of the bottom surface 140 extends past the platform 132 to be flush with the interior surface of the cylinder 104. This portion 146 may facilitate removal of the barrel nut 112 from within a liner 110. That is, the portion 142 may extend to the interior surface of the cylinder 104 and provide a location at which the barrel nut 112 may be pushed up and out of a liner 110.

In selected embodiments, the present invention may include one or more methods. For example, the present invention may include a method of assembly. Accordingly, in certain embodiments, a rotor 40 may be assembled by heating the hub 44 to a temperature enabling the outer races of the bearings 74 of the feathering spindle 64 to the fitted into position. Next, the seals 76, inner races, roller packs, and preload mechanism 84 may be fitted to the tensioning sleeve 72. The tensioning sleeve 72 may then be position in a spindle support 104 of a hub 44 by threading the tensioning sleeve 72 into the thrust flange 78. The preload mechanism 84 may be tightened to properly preload the bearings 74.

With the feathering spindle 64 in position and sealed, it may be ready to receive the root of a corresponding rotor blade 42 therewithin. In selected embodiments, the feathering spindle 64 and hub 44 may be heated by circulating hot oil through the annular cavity therebetween. This heating may continue until the feathering spindle 64 has expanded sufficiently for the root of the rotor blade 42 to be inserted within the interior of the tensioning sleeve 72. A tool or jig may be used to align the rotor blade 42 and the pitch horn 80 to ensure the pitch of the blade 42 is proper. Finally, bolts 88 that were previously fitted to the root of the rotor blade 42 may be inserted through corresponding apertures 90 in the thrust flange 78 and tightened to a desired tension, torque, etc.

The present invention may be embodied in other specific forms without departing from its operating principles or essential characteristics. The described embodiments are to be considered in all respects only as illustrative, and not restrictive. The scope of the invention is, therefore, indicated by the appended claims, rather than by the foregoing description. All changes which come within the meaning and range of equivalency of the claims are to be embraced within their scope.

What is claimed and desired to be secured by United States Letters Patent is:

1. A rotorcraft comprising:
    an airframe;
    at least one engine connected to the airframe; and
    a rotor connected to the airframe and defining axial and radial directions, the rotor comprising
        a hub,
        a rotor blade having a root and a tip and forming a conduit extending in the radial direction from the root to the tip, the root comprising a wall forming a hollow circular cylinder, the hollow circular cylinder forming a portion of the conduit, the root further defining a plurality of longitudinal apertures extending longitudinally from an end of the root and into the root, the root further including a plurality of radial apertures extending radially through the root and each intersecting a longitudinal aperture of the plurality of longitudinal apertures,
        a feathering spindle rotatably connected to the hub,
        a plurality of bolts extending into the plurality of longitudinal apertures and protruding into the plurality of radial apertures, and
        a plurality of fasteners positioned within the radial apertures and fastened to the plurality of bolts.
2. The rotorcraft of claim 1, further comprising a flow of compressed air generated by the at least one engine.
3. The rotorcraft of claim 2, wherein the flow of compressed air passes through the hollow cylinder.
4. The rotorcraft of claim 3, wherein the rotor blade is formed of a fiber-reinforced composite material.
5. The rotorcraft of claim 1, wherein the feathering spindle defines an interior cylindrical cavity extending in the radial direction therethrough.
6. The rotorcraft of claim 5, wherein the feathering spindle receives the root of the rotor blade within the interior cavity.
7. The rotorcraft of claim 6, further comprising a flow of compressed air generated by the at least one engine, the flow of compressed air passing through the interior cylindrical cavity and through the conduit from the root to the tip of the rotor blade.
8. The rotorcraft of claim 7, wherein the feathering spindle comprises at least one tapered roller bearing interfacing with the hub.
9. The rotorcraft of claim 8, wherein the feathering spindle further comprises an inboard end and an outboard end, spaced in the radial direction from the inboard end.
10. The rotorcraft of claim 9, wherein the feathering spindle further comprises a thrust flange positioned proximate the inboard end, the thrust flange comprising a plurality of apertures and a pitch arm.
11. The rotorcraft of claim 1, further comprising:
    a thrust flange comprising a plurality of flange apertures and a pitch arm, the plurality of bolts passing through the plurality of flange apertures and securing the thrust flange to the root, the thrust flange engaging an inboard end of the feathering spindle effective to transfer loads from the rotor blade to the hub.
12. A rotor for a rotorcraft, the rotor defining axial and radial directions and comprising:
    a hub,
    at least one rotor blade having a root and a tip and forming a conduit extending in the radial direction from the root to the tip, the root comprising a wall forming a hollow cylinder, the hollow cylinder forming a portion of the conduit and having a plurality of apertures extending longitudinally from an end of the root into the root,
    a feathering spindle rotatably connected to the hub and defining an interior cylindrical cavity,
    a first plurality of bolts substantially identical to one another,
    a second plurality of bolts substantially identical to one another and differing in at least one physical dimension from the first plurality of bolts,
    the first and second plurality of bolts distributed circumferential within the wall of the root in an alternating pattern, and
    the first and second plurality of bolts extending in the radial direction from the wall of the root to secure the at least one rotor blade to the feathering spindle;
    a tip jet secured to the tip of the at least one rotor blade;
    a plurality of threaded fasteners, each securing a different bolt of the first and second pluralities of bolts within a corresponding aperture of the plurality of apertures;
    wherein the root of the rotor blade extends in the radial direction through an interior cylindrical cavity defined by the feather sufficient for each bolt of the first and second plurality of bolts to pass through a corresponding aperture of the plurality of apertures.
13. The rotor of claim 12, further comprising a flow of compressed air passing through the hollow cylinder and down the conduit to feed the tip jet.
14. The rotor of claim 13, wherein:
    the at least one physical dimension comprises overall length;
    the plurality of apertures include first longitudinal apertures and second longitudinal apertures distributed alternatingly around a circumference of the root, the first longitudinal apertures being longer than the second longitudinal apertures;
    the first plurality of bolts are longer than the second bolts and are positioned within the first longitudinal apertures; and
    the second plurality of bolts are positioned within the second plurality of apertures.
15. The rotor of claim 14, wherein the at least one physical dimension further comprises a diameter.
16. A method comprising:
    selecting a rotorcraft comprising
        an airframe,
        at least one engine connected to the airframe,
        a rotor connected to the airframe and defining axial and radial directions, the rotor comprising a hub, a rotor blade having a root and a tip and forming a conduit extending in the radial direction from the root to the tip, the root comprising a wall forming a hollow circular cylinder, the hollow circular cylinder forming a portion of the conduit, the root further defining a plurality of longitudinal apertures extending longitudinally from an end of the root and into the root, the root further including a plurality of radial apertures extending radially through the root and each intersecting a longitudinal aperture of the plurality of longitudinal apertures, a feathering spindle rotatably connected to the hub, a plurality of bolts distributed circumferential within the wall of the root, and extending into the plurality of longitudinal apertures and protruding into the plurality of radial apertures, and a plurality of fasteners positioned within the radial apertures and fastened to the plurality of bolts;

executing, with the rotorcraft, a takeoff; and passing, during the takeoff, a flow of compressed air generated by the at least one engine through the interior cavity and through the conduit from the root to the tip of the rotor blade.

17. The method of claim 16, further comprising flying the rotorcraft at an advance ratio greater than 0.5.

\* \* \* \* \*